United States Patent

Nishimura et al.

[11] Patent Number: 5,897,218
[45] Date of Patent: Apr. 27, 1999

[54] SIGNAL RECORDING/REPRODUCING METHOD AND APPARATUS IN WHICH KEY INFORMATION FOR DESCRAMBLING IS RECORDED IN AN AREA ON THE SIGNAL RECORDING MEDIUM

[75] Inventors: Keizo Nishimura; Takao Arai, both of Yokohama, Japan

[73] Assignee: Hitachi, Ltd., Tokyo, Japan

[21] Appl. No.: 08/867,516

[22] Filed: Jun. 2, 1997

Related U.S. Application Data

[63] Continuation of application No. 08/389,469, Feb. 16, 1995, abandoned.

[30] Foreign Application Priority Data

Feb. 18, 1994 [JP] Japan ..................................... 6-020867

[51] Int. Cl.[6] ................................................. H04N 5/76
[52] U.S. Cl. ................................. 386/94; 386/4
[58] Field of Search .................................... 386/94, 4, 52, 386/77, 81, 95, 39; 360/27, 60, 33.1; 380/3, 4, 5, 10, 20

[56] References Cited

U.S. PATENT DOCUMENTS

| | | | |
|---|---|---|---|
| 4,533,949 | 8/1985 | Fujimura et al. ........................ 358/122 |
| 4,991,208 | 2/1991 | Walker et al. ............................. 380/20 |
| 5,046,090 | 9/1991 | Walker et al. .............................. 380/5 |
| 5,054,064 | 10/1991 | Walker et al. ............................... 380/5 |
| 5,109,413 | 4/1992 | Comerford et al. ........................ 380/4 |
| 5,303,294 | 4/1994 | Kimoto et al. ............................... 380/5 |
| 5,323,244 | 6/1994 | Yamaguchi et al. ..................... 358/335 |
| 5,381,476 | 1/1995 | Kimoto et al. ............................... 380/5 |
| 5,400,402 | 3/1995 | Garfinkle ................................... 380/20 |

OTHER PUBLICATIONS

AV Products with Digital Technology, Fujio Mari, published Dec. 10, 1986 by Corona, Ltd., pp. 212–217.

*Primary Examiner*—Brian Casler
*Assistant Examiner*—Lu Anne P. Din
*Attorney, Agent, or Firm*—Kenyon & Kenyon

[57] ABSTRACT

By receiving a key signal for descrambling before reproducing a program signal so as to record the scrambled program signal as it is and descramble and view it by a decoder at the time of reproducing or by reading and reproducing the record, a signal recording/reproducing method and apparatus therefor wherein a possibility that a program which is distributed for specified viewers with payment is viewed by the public at an optional location without payment is eliminated and on the other hand, a viewer can view a broadcasted program freely at any time he wants is provided.

26 Claims, 14 Drawing Sheets

SIGNAL RECORDING/REPRODUCING METHOD AND APPARATUS IN WHICH KEY INFORMATION FOR DESCRAMBLING IS RECORDED IN AN AREA ON THE SIGNAL RECORDING MEDIUM

This application is a file wrapper continuation of application Ser. No. 08/389,469, filed Feb. 16, 1995, now abandoned.

BACKGROUND OF THE INVENTION

1. Field of the Invention

The present invention relates to a method and apparatus for recording and reproducing various signals and more particularly to a recording/reproducing method and apparatus therefor which are suitable for recording and reproducing a signal scrambled so as to prevent interception.

2. Description of the Prior Art

An addressable CATV system which is described in "AV Products with Digital Technology" under the supervision of Fujio Mari, Corona, Ltd. is an example for sending a signal which is scrambled so as to prevent interception. In such a system, a viewer receives key information for descrambling from the CATV station, descrambles a signal by a decoder, and views a television receiver.

When a viewer has a want to view a broadcasted program later, a video signal of the descrambled decoder output is recorded on a VTR. By doing this, the viewer can view the recorded program later. On the other hand, for the CATV station, there is a problem imposed that there is a possibility that a program which is distributed for specified viewers with payment is viewed by the public at an optional location without payment. This means that the scrambling for interception prevention is not effective. Therefore, the CATV station gives protection to the decoder output so that it may be outputted on a television receiver but cannot be recorded on a VTR. By doing this, there is another problem imposed that the viewer's want to view a broadcasted program later instead of right now cannot be satisfied.

As mentioned above, the prior art has a defect that, for example, the request of the CATV station and the request of a viewer cannot be satisfied at the same time.

SUMMARY OF THE INVENTION

An object of the present invention is to eliminate the defect of the prior art mentioned above and to provide a signal recording/reproducing method and apparatus therefor by which the CATV station eliminates a possibility that a program which is distributed for specified viewers with payment is viewed by the public at an optional location without payment and on the other hand, a viewer can view a broadcasted program freely at any time he wants. Needless to say, it is not limited to CATV. The same problem is also solved in satellite broadcasting and other pay TV program distributing systems.

Therefore, the present invention is a signal recording/reproducing method in a recording/reproducing system having a signal recording medium and a recording/reproducing means on the medium, which inputs a scrambled signal, records the inputted scrambled signal as it is on the signal recording medium, and when key information for descrambling the scrambling is obtained and reproduced by at least one of recording and reading from the signal recording medium and of inputting from the outside of the recording/reproducing system, reproduces the scrambled signal recorded on the signal recording medium as it is together with the obtained key information.

More concretely, a scrambled signal is recorded as it is, inputted to the decoder together with the key information for reproducing, and descrambled and viewed. Key information is generally sent before a signal of a scrambled program, so that it is used for reproducing as it is or recorded before the region where the program signal is recorded. When key information is recorded, it may be recorded by the same handling as that of a program signal or may be recorded separately. The function and effect are the same in both of them. Namely, for example, when a recording/reproducing apparatus to which this system is applied is a helical scan type recording/reproducing apparatus such as a general VTR, a system for recording key information on the helical track and recording a program signal continuously, a system for dividing the helical track into regions and recording the key information at the top of the program signal or in the key information recording region of the helical track before it, or a system for setting another recording region such as a linear track and recording the key information at the location where it can be reproduced before the program signal can obtain the same effect.

Needless to say, this system can be applied to a recording/reproducing method and apparatus therefor using a tape recorder of the linear track system or a disk in the exactly same way. Also in these cases, a recording region for recording key information at the location where a program signal can be reproduced and outputted before starting to reproduce the program signal and a recording track are set.

By doing this, the present invention performs the function and operation shown below.

By recording key information and a scrambled program signal as mentioned above, it is possible for a viewer to reproduce this signal recording medium, for example, a tape at any time he wants, to input the scrambled program signal to the predetermined decoder subsequently to the key information, to descramble the signal, and to view it, for example, by a television receiver. The signal reproduced from this tape cannot be descrambled by the key information by other than the predetermined decoder of a contracted viewer, so that the CATV station can eliminate a possibility that a program which is distributed for specified viewers with payment is viewed by the public at an optional location without payment.

When key information is reproduced and outputted when reproducing of a program signal is started and the key information is erased from the recording region or overwritten to an ineffective signal, the program becomes unable to be viewed two times and the system can be applied to distribution of a program for which the reproducible number is limited. Furthermore, a method that data indicating the allowed reproducible number is coded in key information, and whenever a program is reproduced, the allowed number is decremented by one, and the reduced number is overwritten as new key information may be used. Needless to say, in this case, a function that the decoder also decodes data indicating the allowed reproducible number and performs an operation corresponding to the allowed reproducible number is necessary.

Next, when reproducing is suspended halfway and the sequel is reproduced later again, the key information cannot be reproduced as it is, so that the program cannot be descrambled. Therefore, the medium is rewound or reversed up to the location where the key information is recorded, and the key information is reproduced and outputted, and the reproducing restart position is cued up by fast forwarding, and then the program is reproduced. Therefore, when key information and a program are recorded, for example, the position information indicating the relative position of the program signal on the basis of the key information recording position is recorded on a recording medium and the top position can be cued up using it. This position information may use a special recording region like the time code of VTR, or may be superimposed on the program signal, or may be time-division multiplexed or frequency-division multiplexed in the recording signal. Either of the recording methods can obtain the same effect and the recording method per se is not the subject of the present invention. When this position information can be displayed on a recording/reproducing apparatus, it is possible for a viewer t o look at this position information, search for the recording position of the key information, reproduce the key information, and cue up the program reproducing position again.

Furthermore, when a viewer looks at the position information of the reproducing restart position, he can find the direction and location of the key information recording position. Therefore, a control mechanism that the position information of restart position is stored in the memory, and the recording medium is automatically rewound or reversed or forwarded fast when applicable and reviewed back to the key information recording position which is the reference position with reference to the position information on the recording medium successively, and the key information is reproduced, and the reproducing restart position is cued up on the basis of the stored position information, and the reproducing is automatically restarted can be constituted. By doing this, for example, in the case of a cassette type tape recorder, a viewer can view the sequel of a program which is descrambled automatically via the decoder only by inserting the cassette.

On the other hand, in case that the key information is erased or overwritten when starting reproducing from the begining of a program, when reproducing a recorded program from a restart position, even if the recording medium is reviewed back to the position where the key information is recorded by the position information as mentioned above, the key information, that has already been erased or overwritten, can no longer be reproduced. Therefore, in such a case, it is desirable to store the key information temporarily in the memory at the time of restarting the next reproduce region and to write the key information stored at the location when the reproducing is suspended. As to the recording position of key information, when the relation with the top of the program signal whose reproducing is to be restarted next is made equivalent to the relation between the initial key information and the top of the program signal, there is no need to install a special step and means for restarting reproducing and it is desirable. Also in the case of rewinding, reversing, or fast forwarding, it is possible to write the key information in the position and then to execute the predetermined operation.

Even in the case of suspension of reproducing, when the reproducing is restarted immediately in succession and there is no need to resend key information to the decoder for descrambling newly or the key information stored in the memory can be outputted as it is, the key information may not be written in the reproducing restart position of the signal recording medium. In this case, when the reproducing is to be suspended and the signal recording medium is to be ejected or the power of the apparatus is to be turned off, the key information stored in the memory is written in the position immediately before executing the operation and then the predetermined operation is executed.

By doing this, a signal recording/reproducing method and apparatus therefor by which a possibility that a program which is distributed for specified viewers with payment is viewed by the public at any location without payment is eliminated and on the other hand, a viewer can view a broadcasted program freely at any time he wants can be realized.

The foregoing and other objects, advantages, manner of operation and novel features of the present invention will be understood from the following detailed description when read in connection with the accompanying drawings.

DETAILED DESCRIPTION OF PREFERRED EMBODIMENTS

Details of the present invention will be explained hereunder using embodiments. An example that the present invention is applied to a helical scan type VTR for recording and reproducing a scrambled video signal which is distributed together with key information with payment via a CATV channel will be described. Needless to say, it is clear from the following explanation that the present invention can be applied also to other media and signal systems and the same effect can be obtained. The present invention is explained as a recording/reproducing apparatus. However, as to a program signal, an apparatus which has only a reproducing function may be constituted. Also in this case, it will be made clear by the following detailed explanation that the same effect can be obtained by the same operation and function as those of the operation explanation of the reproducing section.

Figure 1:
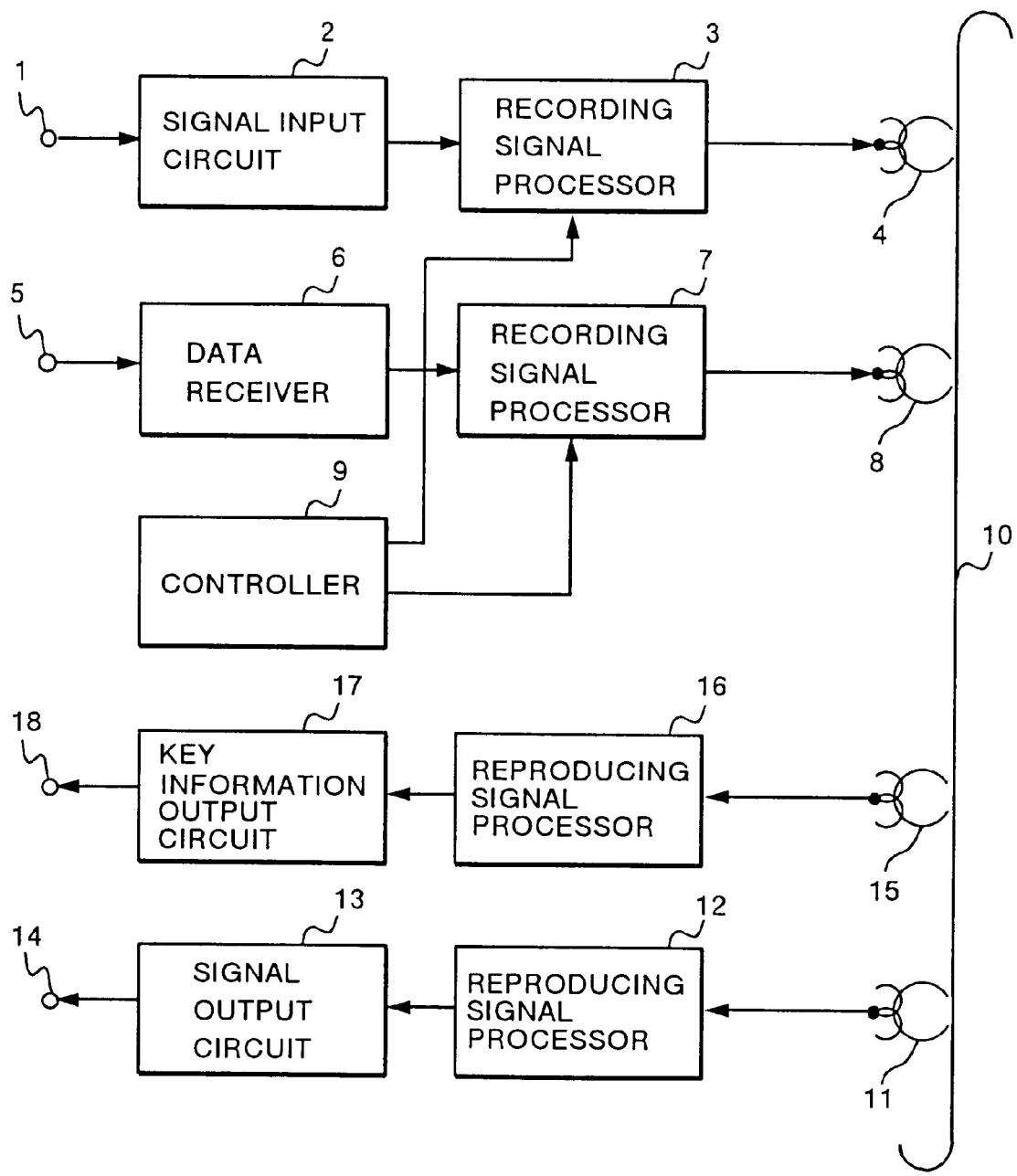
FIG. 1 is a block diagram showing an embodiment of the present invention.
Figure 2:
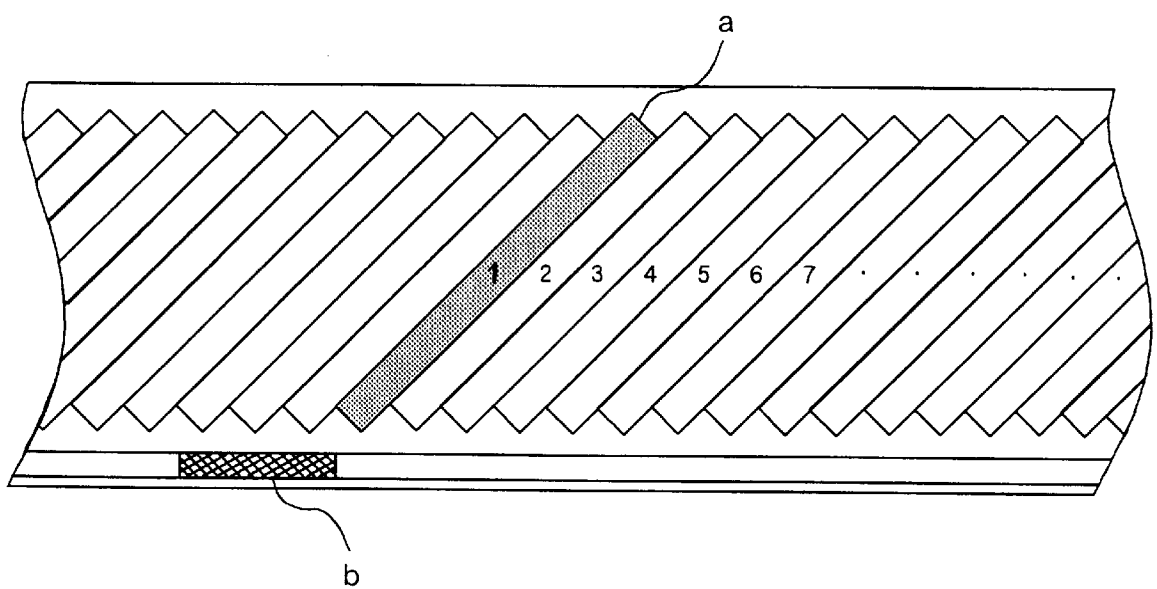
FIG. 2 is a schematical diagram of the signal recording pattern for explaining the embodiment shown in FIG. 1.

A system that distribution of a program signal and key information for descrambling it are sent via different channels will be explained with reference to FIGS. 1 and 2. For example, an application example to a system that a program signal is sent via a CATV channel and key information is sent via a telephone channel will be explained. FIG. 1 is a block diagram showing an embodiment of the basic constitution of an apparatus using the recording and reproducing system of the present invention and FIG. 2 is a schematical diagram showing the recording pattern on the tape. In the block diagram, the head for recording and reproducing on the helical track and the head for recording and reproducing on the linear track are displayed in the same way. However, they are distinguished from each other in the explanation. The recording head and the reproducing head are handled as different heads in the explanation. However, needless to say, even an apparatus having a head which serves as both recording and reproducing cannot deteriorate the subject and inherency of the present invention. The same may be said with the other embodiments which will be described hereunder.

In FIG. 1, numeral 1 indicates a program signal input terminal, 2 a signal input circuit, 3 a recording signal processor, 4 a magnetic head for a helical track attached to the rotary drum, 5 a key information input terminal, 6 a data receiver, 7 a recording signal processor for key information, 8 a magnetic head for a linear track, 9 a controller, 10 a magnetic tape, 11 a magnetic head for a helical track attached to the rotary drum, 12 a reproducing signal processor, 13 a signal output circuit, 14 a program signal output terminal, 15 a magnetic head for a linear track, 16 a reproducing signal processor for key information, 17 a key information output terminal, and 18 a key information output terminal.

A scrambled video signal for interception prevention is inputted to the program signal input terminal 1 as a program signal via a CATV channel and sent to the signal input circuit 2. Several forms of this input signal can be considered depending on how to interface between the decoder for descrambling and the recording/reproducing apparatus to which the present invention is applied. However, for explaining only relating to the subject of the present invention hereunder, it is assumed that after the channel is selected, and the modulation which is performed for signal transmission is demodulated, and a code error during transmission is detected and corrected in the case of digital transmission, a signal is inputted. Therefore, depending on how to interface with the decoder, there may be a constitution that the signal input circuit 2 includes a tuner, demodulator, and error correction circuit. There may be a constitution that the signal output circuit 13 which will be described later also includes an error correction code generator, modulator, and RF converter. In this embodiment, it is assumed that the input and output of the recording/reproducing apparatus is a digital video signal. In this case, it can be considered that an input signal in which the time axis is compressed is recorded at high speed and it is switched to an output signal in which the time axis is extended for reproducing. However, in this embodiment, a case that the time axis is not processed particularly will be explained. These points are also applied to the other embodiments which will be described later. The signal input circuit 2 sends the digital video signal which is scrambled to the recording signal processor 3 for a program signal as it is.

On the other hand, key information for releasing the scrambling which is applied to this program by the decoder having the predetermined registered address is inputted from the key information input terminal 5. As to this key information, there are two cases available, that is, one is a case that it is inputted or outputted directly from a telephone channel and the other is a case that it is inputted or outputted via the decoder. There is not a great difference essentially between them, so that it is assumed for explanation hereunder that key information is inputted or outputted according to a program signal via the decoder. Key information from the key information input terminal 5 is inputted to the data receiver 6, received as key information, and then sent to the recording signal processor 7 for key information.

The recording signal processor 3 and the recording signal processor 7 execute signal processing for recording on a tape for a scrambled digital video signal and key information for descrambling it respectively, that is, block dividing of the signal, addition of an error detecting code or an error correcting code, and modulation for the recording. The timing is controlled by the controller 9 and the digital video signal and key information are recorded on the magnetic tape 10 by the rotary magnetic head 4 and the stationary magnetic head 8 respectively. The controller 9 adjusts the timing for outputting recording signals by the recording signal processor 3 and the recording signal processor 7 so as to obtain the recording signal which is schematically shown in FIG. 2. Namely, the scrambled digital video signal which is a program signal is recorded on the helical tracks starting at "a" shown in FIG. 2 in the order of 1, 2, 3, 4, - - - and on the other hand, the key information is recorded in the location indicated by "b" shown in FIG. 2 where it can be reproduced before the top of the video signal. It is noted that the relative position between the top "a" of an actual video signal and the key information "b" depends on the actual relative position between the rotary head and stationary head and is not exactly the same as that shown in FIG. 2. FIG. 2 just shows a schematic example.

At the time of reproducing, the key information at the part "b" of the linear track is reproduced by the stationary magnetic head 15 from the magnetic tape 10 which is recorded as shown in FIG. 2 first and inputted to the reproducing signal processor 16 for key information. Then, the scrambled digital video signal is reproduced starting at the part "a" of the helical track in the order of 1, 2, 3, 4, - - - shown in FIG. 2 by the rotary magnetic head and inputted to the reproducing signal processor 12 for a program signal. The reproducing signal processor 12 and the reproducing signal processor 16 demodulate the record modulation which is executed in the scrambled digital video signal which is reproduced from the magnetic tape 10 by the magnetic head 11 and the magnetic head 16 respectively and in the key information for descrambling the scrambled signal, detect and correct a code error which occurs in the recording and reproducing, furthermore regenerates the signal which is divided into blocks to the original continuous signal, and output the scrambled digital video signal and key information for descrambling the scrambled signal respectively from the program signal output terminal 14 and the key information output terminal 18 via the signal output circuit 13 and the key information output circuit 17.

As mentioned above, key information for descrambling is outputted from the key information output terminal 18 first and then a scrambled video signal is outputted from the program signal output terminal 14. Therefore, when these are connected to the predetermined decoder having the registered address, a viewer can view the desired program at any time. On the other hand, when this tape is reproduced by an apparatus which is possessed by a person who has a decoder and the address of the decoder is different, the scrambling of the program to be reproduced cannot be descrambled by the key information which is reproduced from the tape. Therefore, it can be prevented that a program which is distributed for specified viewers with payment is viewed by the public at any location without payment.

In the aforementioned embodiment, the key information is sent via a channel which is different from that of the program signal. However, in the following embodiments, it is assumed that the program signal and key information are sent via the same channel. Needless to say, how to send key information and the recording system thereof can constitute a system by any combination.

Figure 3:
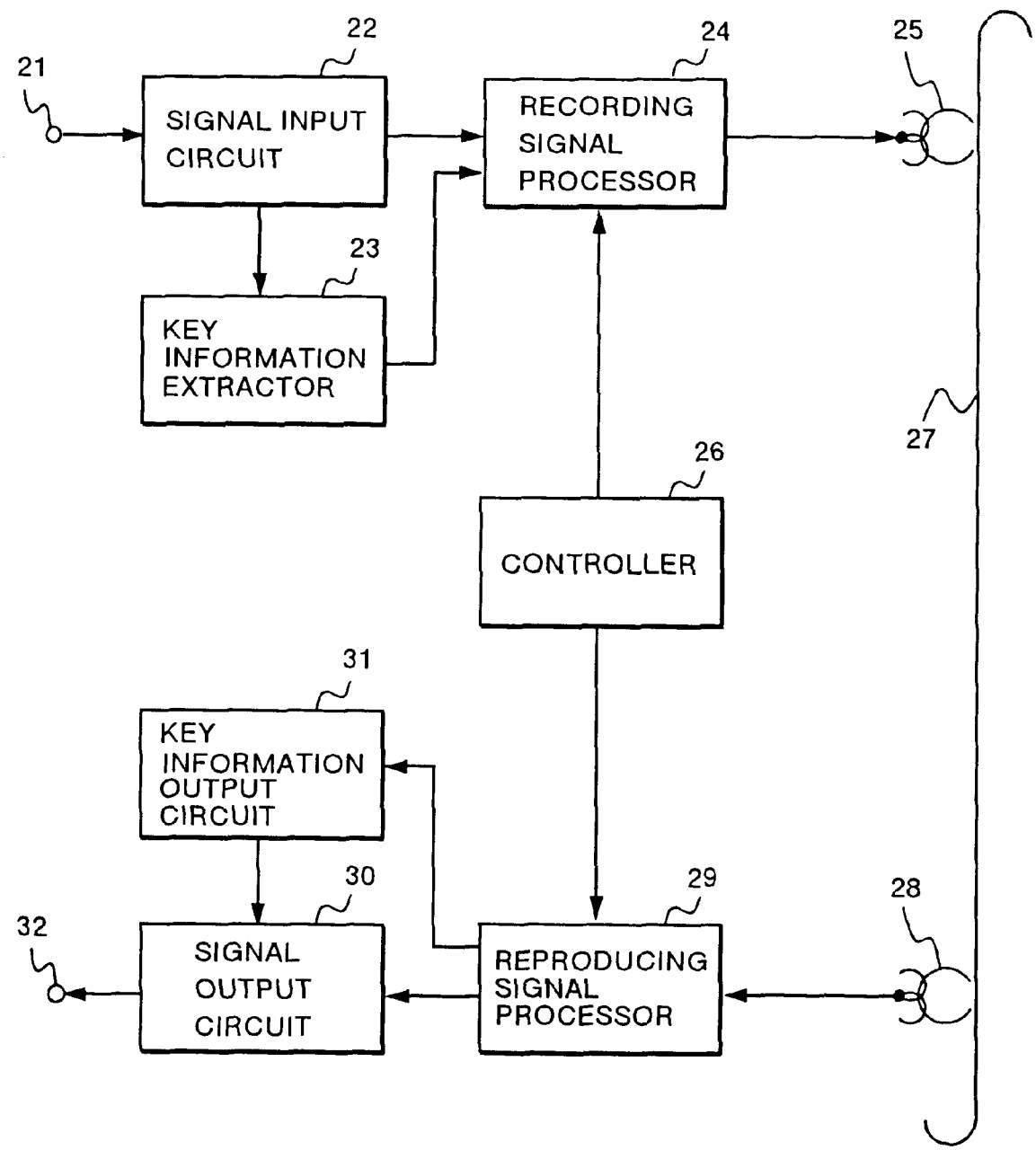
FIG. 3 is a block diagram showing the second embodiment of the present invention.
Figure 4:
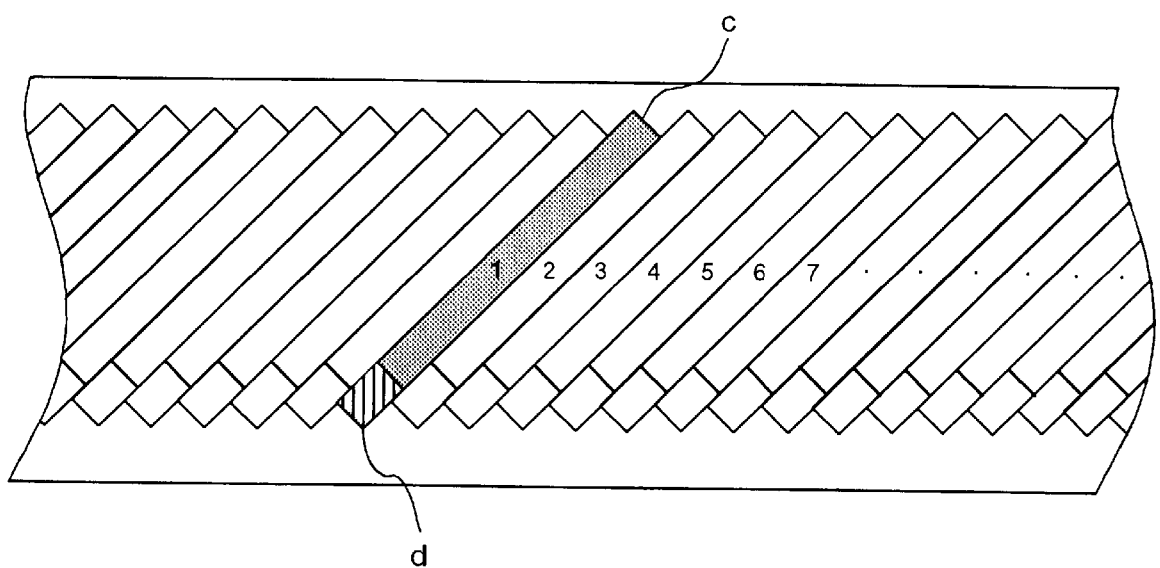
FIG. 4 is a schematical diagram of the signal recording pattern for explaining the embodiment shown in FIG. 3.

Next, a case that key information and a program signal are sent via a CATV channel and they are all recorded on the helical track by the region dividing system will be explained as a second embodiment of the present invention with reference to FIGS. 3 and 4. FIG. 3 is a block diagram showing the second embodiment of the apparatus using the recording and reproducing system of the present invention and FIG. 4 is a schematical diagram of the recording pattern on the tape thereof. In FIG. 3, numeral 21 indicates a signal input terminal, 22 a signal input circuit, 23 a key information extracting circuit, 24 a recording signal processor, 25 a magnetic head attached to the rotary drum, 26 a controller, 27 a magnetic tape, 28 a magnetic head attached to the rotary drum, 29 a reproducing signal processor, 30 a signal output circuit, 31 a key information output circuit, and 32 a signal output terminal.

Key information and then scrambled digital video signal are inputted to the signal input terminal 21. They are inputted to the signal input circuit 22 and the key information is separated and extracted by the key information extractor 23. The scrambled digital video signal and key information for descrambling it are sent to the recording signal processor 24 respectively from the signal input circuit 22 and the key information extracting circuit 23 after each timing is adjusted. The recording signal processor 24 multiplexes the key information and digital video signal which are controlled in timing by the controller 26 and inputted and executes signal processing for recording them on the tape, such as signal block dividing, addition of an error detecting code and error correcting code, and record modulation. They are recorded on the magnetic tape 27 as shown in FIG. 4. The controller 26 controls the recording signal processor 24 so that the key signal is recorded in the region indicated by "d" shown in FIG. 4 and the scrambled digital video signal is recorded starting from the region which is indicated by "c" which follows "d" and in the order of 1, 2, 3, 4, 5, - - - . In the same way as with FIG. 2, the recording position of the key information shown in FIG. 4 is just an example. When it is a position where the key information can be reproduced before the digital video signal which is a program signal, for example, a position which is one track before may be used.

At the time of reproducing, the scrambled digital video signal is reproduced in the order of 1, 2, 3, 4, 5, - - - subsequently to the key signal at "d" shown in FIG. 4 from the magnetic tape 27 which is recorded as shown in FIG. 4 by the rotary magnetic head 28 and inputted to the reproducing signal processor 29. The reproducing signal processor 29 is controlled by the controller 26, demodulates the record modulation which is executed for the inputted scrambled digital video signal and key information for descrambling the scrambled signal, detects and corrects a code error which occurs in the recording and reproducing, furthermore returns the signal which is divided into blocks to the original continuous signal, and sends the digital video signal to the signal output circuit 30 and the key information to the key information output circuit 31. The key information output circuit 31 sends the key information to the signal output circuit 30 before the signal output circuit 30 sends the digital video signal and the signal output circuit 30 outputs the key information and scrambled digital video signal in this order via the signal output terminal 32.

As mentioned above, also in the embodiment shown in FIG. 3, in the same way as with the embodiment shown in FIG. 1, the key information for descrambling and then the scrambled video signal are outputted. Therefore, when these are connected to the predetermined decoder having the registered address, a viewer can view the desired program at any time. On the other hand, when this tape is reproduced by an apparatus which is possessed by a person who has a decoder and the address of the decoder is different, the scrambling of the program to be reproduced cannot be descrambled by the key information which is reproduced from the tape. Therefore, it can be prevented that a program which is distributed for specified viewers with payment is viewed by the public at any location without payment.

Figure 5:
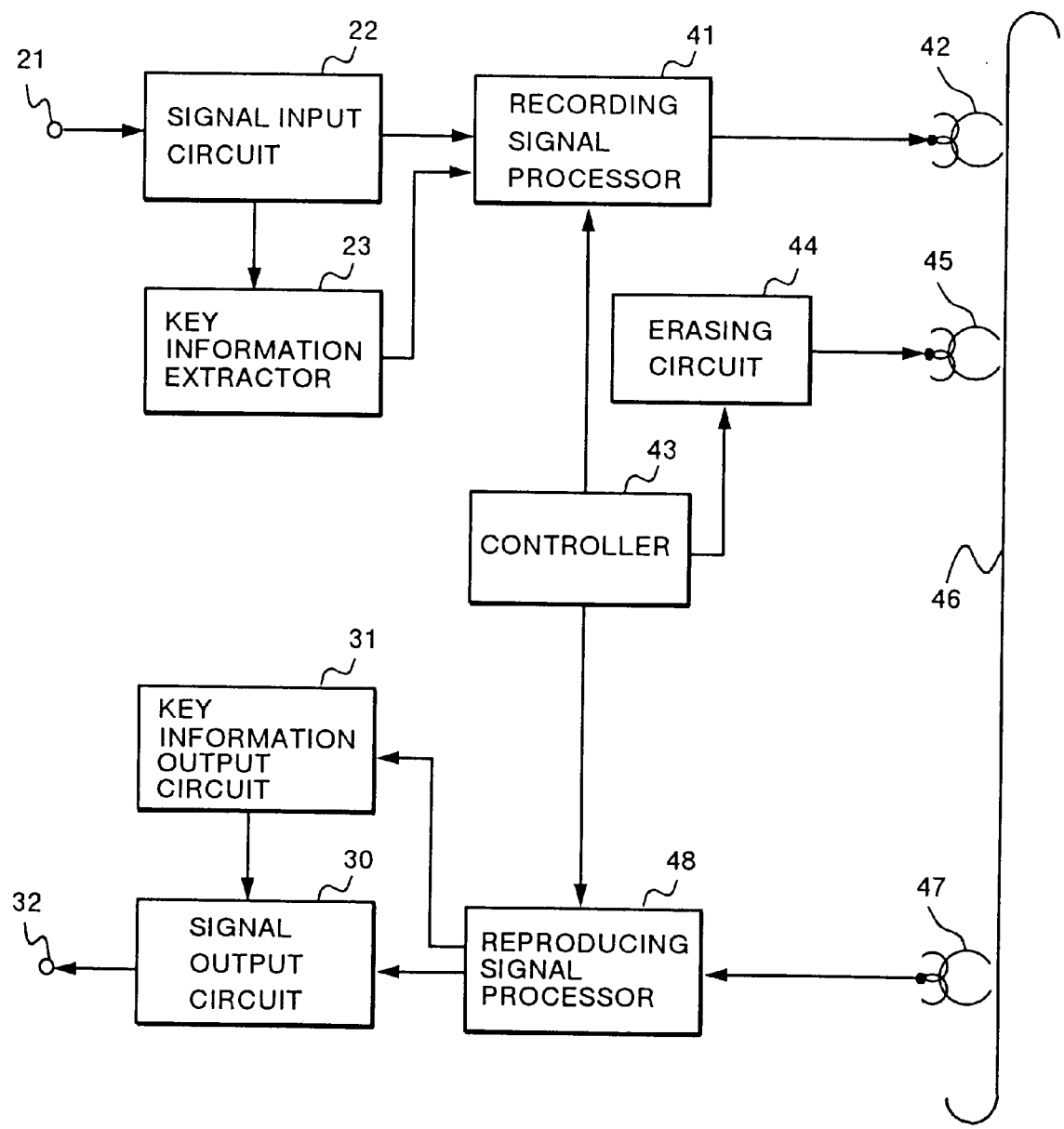
FIG. 5 is a block diagram showing the third embodiment of the present invention.

For pay TV program distribution, there is a case that only one viewing is permitted and it is prohibited to record a program on a VTR and to reproduce it again. Next, an example to which the present invention is applied so as to make it possible to view at an optional time other than the time that a program is distributed even in such a case will be explained using the embodiment shown in FIGS. 5 and 6. The next embodiment will be explained using a recording system on a tape which records both key information and a digital video signal on an equivalent helical track unlike the aforementioned two embodiments. FIG. 5 is a block diagram showing the third embodiment of the apparatus using the recording/reproducing system of the present invention and FIG. 6 is a schematical diagram of the recording pattern on the tape shown in FIG. 5.

In FIG. 5, numeral 41 indicates a recording signal processor, 42 a magnetic head attached to the rotary drum, 43 a controller, 44 an erasing circuit for driving the erasing head, 45 an erasing head attached to the rotary drum, 46 a magnetic tape, 47 a magnetic head attached to the rotary drum, and 48 a reproducing signal processor and the others are the same as those shown in FIG. 3.

In FIG. 5, the operation of signal recording is almost the same as that of the embodiment shown in FIG. 3. The recording signal processor 41 records the the key information and scrambled digital video signal on the magnetic tape 46 via the rotary magnetic head 42 so that the recording signal on the tape becomes as shown in FIG. 6 by the controller 43. The controller 43 controls the recording signal processor 41 so as to form the recording pattern on the magnetic tape 46 so that the key information is recorded on the helical track indicated by "f" shown in FIG. 6 and then the scrambled digital video signal is recorded starting from the helical track indicated by "e" shown in FIG. 6 in the order of 1, 2, 3, 4, 5, - - - . Depending on how the key information and the digital video signal input from signal input terminal 21, some cases may be considered, for example, they may not be inputted to the recording signal processor 41 after the key information is separated and extracted by the key information extracting circuit 23 and the timing is adjusted. In such a case, the digital video signal is inputted to the recording signal processor 41 subsequently to the key information from the signal input circuit 22. The same may be said on the reproducing side which will be described later.

Figure 6:
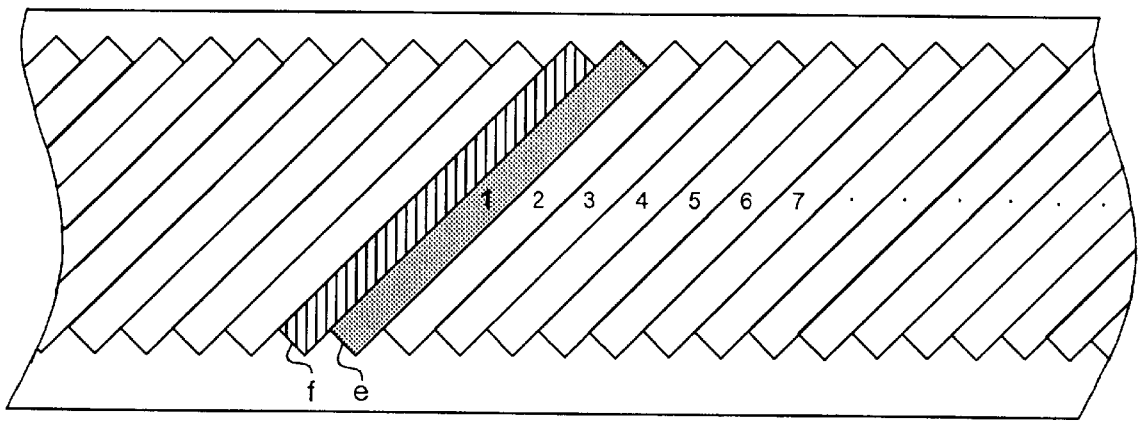
FIG. 6 is a schematical diagram of the signal recording pattern for explaining the embodiment shown in FIG. 5.

At the time of reproducing, the rotary magnetic head 47 reads the key information at "f" shown in FIG. 6 from the magnetic tape 46 first and inputs it to the reproducing signal processor 48. The controller 43 drives the erasing circuit 44 and erases the key information at "f" shown in FIG. 6 which is recorded on the magnetic tape by the erasing head 45. In this case, when the erasing head 45 is arranged on the rotary drum so as to trace immediately behind the rotary magnetic head which is used for reproducing, there is no need conveniently to rewind the magnetic tape 46. When the erasing of the key information ends in this way, the rotary magnetic head 47 reproduces the digital video signal subsequently to it starting from "e" shown in FIG. 6 in the order of 1, 2, 3, 4, 5, - - - and inputs it to the reproducing signal processor 48. Next, in the same way as with the embodiment shown in FIG. 3, the reproducing signal processor 48 is controlled by the controller 43, demodulates the record modulation which is executed for the inputted scrambled digital video signal and key information for descrambling the scrambled signal, detects and corrects a code error which occurs in the recording and reproducing, furthermore returns the signal which is divided into blocks to the original continuous signal, and sends the digital video signal to the signal output circuit 30 and the key information to the key information output circuit 31. The key information output circuit 31 sends the key information to the signal output circuit 30 before the signal output circuit 30 sends the digital video signal and the signal output circuit 30 outputs the key information and scrambled digital video signal in this order via the signal output terminal 32.

As mentioned above, also in the embodiment shown in FIG. 5, in the same way as with the embodiments shown in FIGS. 1 and 3, the key information for descrambling and then the scrambled video signal are outputted. Therefore, when these are connected to the predetermined decoder having the registered address, a viewer can view the desired program at any time. On the other hand, when this tape is reproduced again, even when a viewer is the contracted viewer himself, the key information is already erased, so that the scrambling of the program to be reproduced cannot be descrambled and it can be prevented that a program which is distributed with payment is viewed repeatedly without payment.

Figure 7:
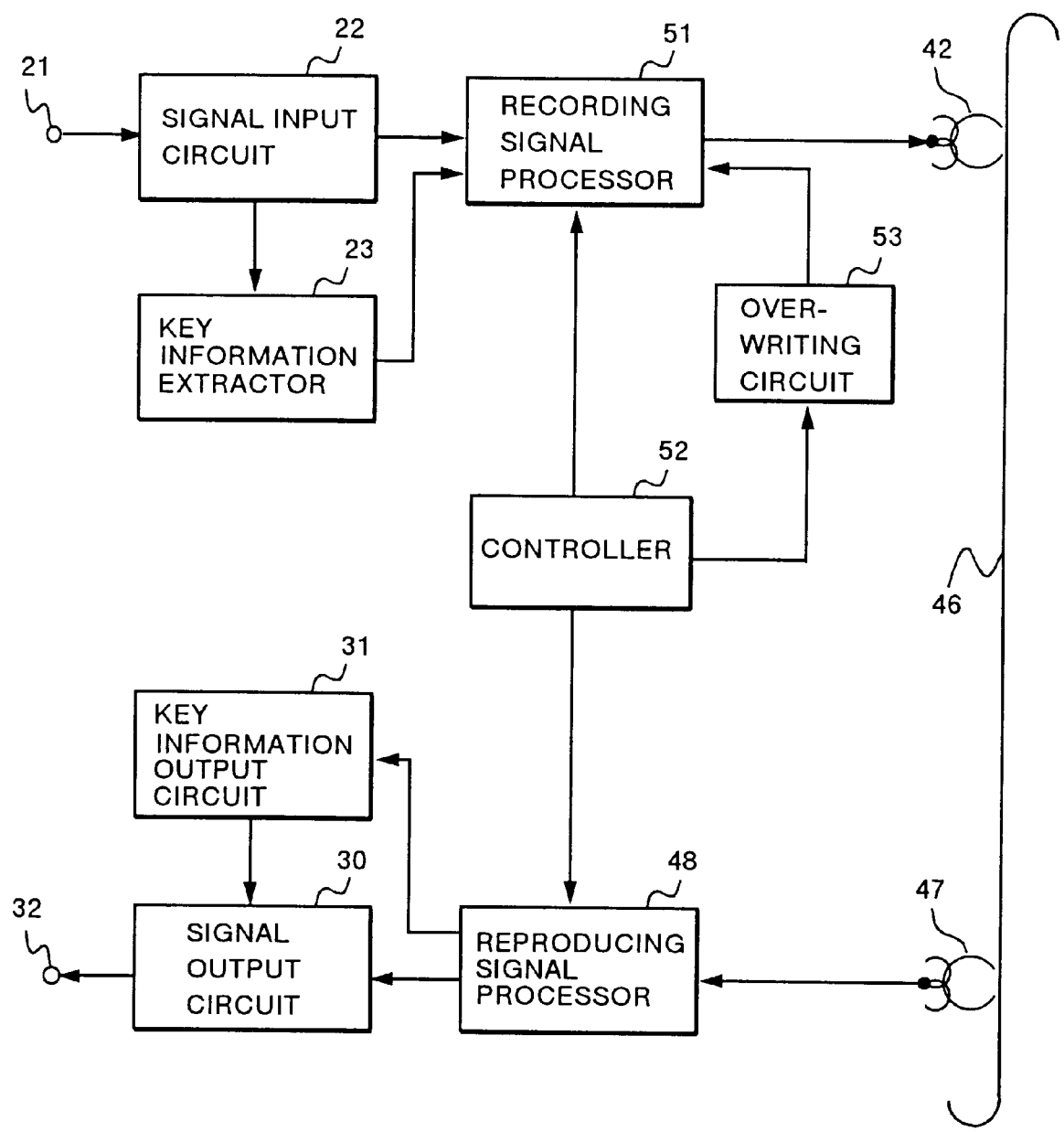
FIG. 7 is a block diagram showing the fourth embodiment of the present invention.

For the same purpose, the same effect can be obtained without an erasing circuit and erasing head being installed specially. Next, the embodiment will be explained with reference to FIG. 7. FIG. 7 is a block diagram showing the fourth embodiment of the apparatus using the recording/reproducing system of the present invention. In FIG. 7, numeral 51 indicates a recording signal processor, 52 a controller, and 53 a overwriting signal generator and the others are the same as those shown in FIG. 5. In the embodiment shown in FIG. 7, input and output and recording and reproducing of key information and a digital video signal are exactly the same as those in the embodiment shown in FIG. 5, so that the explanation of the operation thereof will be omitted and only the processing of the key information recording region ("f" shown in FIG. 6) on the magnetic tape 46 at the time of reproducing will be described.

In the embodiment shown in FIG. 7, using the fact that when the key information is not erased but overwritten to another ineffective signal, it cannot be descrambled, the key information on the tape is overwritten. When the rotary magnetic head 47 reproduces the key information from the magnetic tape 46 at the time of reproducing and inputs it to the reproducing signal processor 48, the controller 52 controls the overwriting signal generator 53 and the recording signal processor 51 for overwriting the key information. The overwriting signal generator 53 generates ineffective data as key information which is preset by an instruction from the controller 52 and sends it to the recording signal processor 51. The recording signal processor 51 constitutes the data from the overwriting signal generator 53 as a recording signal and overwrites it at the position ("f" shown in FIG. 6) of the key information on the magnetic tape 46 by the rotary magnetic head 42 by an instruction of the controller 52. By doing this, the key information for descrambling the digital video signal is changed to another ineffective data, so that even when it is reproduced again, correct key information cannot be reproduced.

As mentioned above, also in the embodiment shown in FIG. 7, the same effect as that of the embodiment shown in FIG. 5 can be obtained. Furthermore, when the recording system on the magnetic tape 46 is a recording system which can overwrite, there is no need to install a special means for overwriting and the overwriting signal generator 53 may be, for example, a stationary pattern generator, so that the constitution can be simplified compared with the example shown in FIG. 5. Or, when the overwriting signal generator 53 is omitted and the recording signal processor 51 only generates a code error in the key information position ("f" shown in FIG. 6) on the magnetic tape 46 via the rotary magnetic head 42, the same effect can be obtained.

Figure 8:
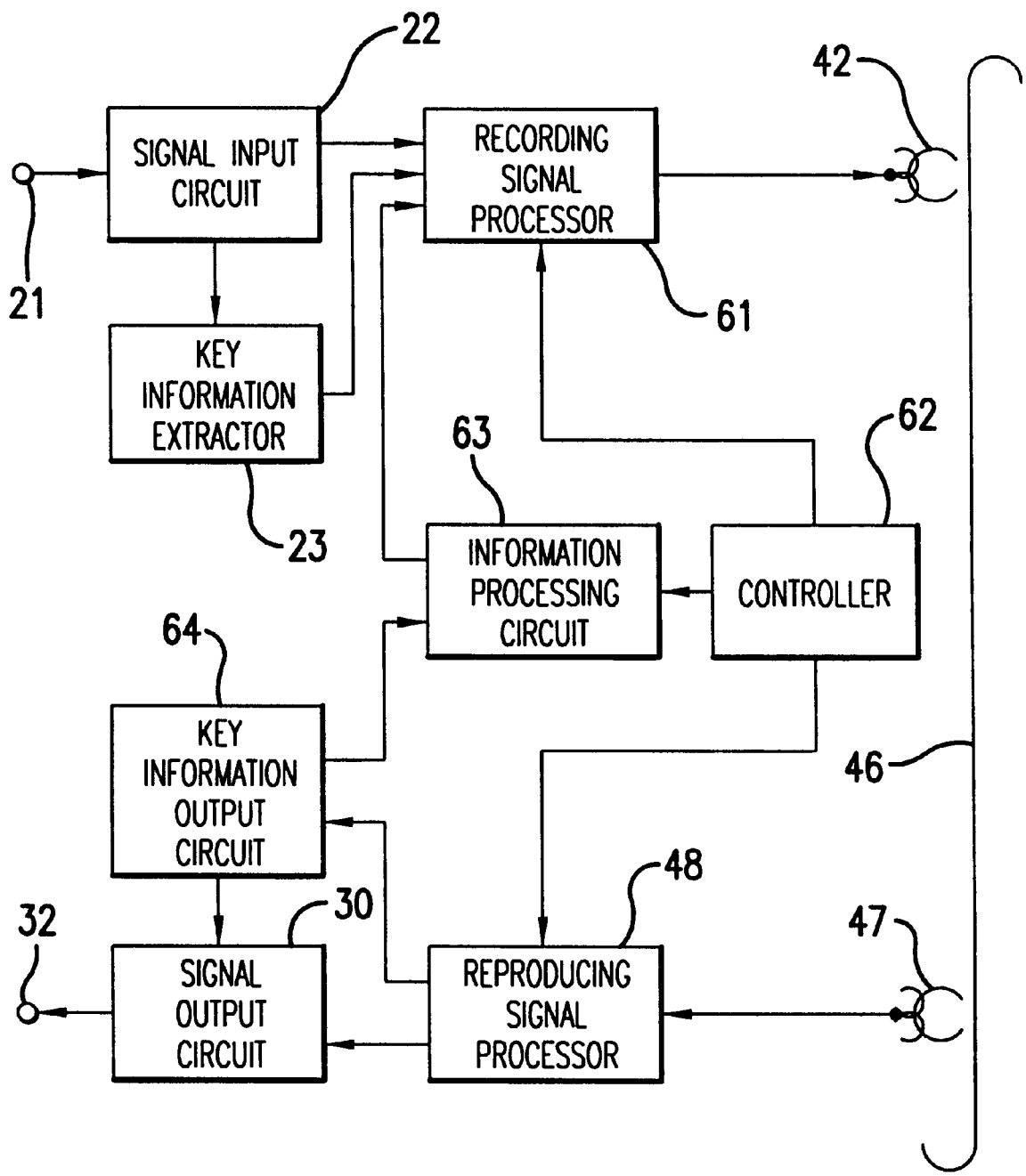
FIG. 8 is a block diagram showing the fifth embodiment of the present invention.

Next, a case that viewing of a plurality of times is permitted instead of only one viewing as shown in the examples in FIGS. 5 and 7 will be explained using the embodiment shown in FIG. 8. FIG. 8 is a block diagram showing the fifth embodiment of the apparatus using the recording/reproducing system of the present invention. In FIG. 8, numeral 61 indicates a recording signal processor, 62 a controller, 63 an information processor, and 64 a key information output circuit and the others are the same as those in the embodiment shown in FIG. 7. Also in the embodiment shown in FIG. 8, input and output and recording and reproducing of key information and a digital video signal are exactly the same as those in the embodiments shown in FIGS. 5 and 7, so that the explanation of the operation thereof will be omitted and only the processing of the key information recording region ("f" shown in FIG. 6) on the magnetic tape 46 at the time of reproducing will be described.

The embodiment shown in FIG. 8 is applied to a case that the count of viewing is systematically coded in the key information. For example, it is a system that key information consists of information for descrambling and a value indicating the allowed reproducible number and when the allowed reproducible number becomes 0, the scrambling cannot be descrambled. When the rotary magnetic head 47 reads key information from the magnetic tape 46 at the time of reproducing and inputs it to the reproducing signal processor 48, the controller 62 lets the reproducing signal processor 48 send the key information to the key information output circuit 64 so as to output the key information. The key information output circuit 64 sends the key information to the signal output circuit 30 in the predetermined timing and also sends the reproduced key information to the information processor 63. The information processor 63 decrements the value indicating the allowed reproducible number among the key information by one by an instruction from the controller 62 and sends it to the recording signal processor 61. However, when the allowed reproducible number of the key information which is already reproduced is 0, it is desirable to leave it unchanged without being decremented. The recording signal processor 61 constitutes the converted key information from the information processor 63 as a recording signal and overwrites it in the key information position ("f" shown in FIG. 6) on the magnetic tape 46 by the rotary magnetic head 42 by an instruction of the controller 62. By doing this, the value indicating the allowed reproducible number of the key information for descrambling the digital video signal can be decremented by one every viewing. When the value indicating the allowed reproducible number becomes 0, even when the key information is reproduced again, the digital video signal cannot be descrambled.

As mentioned above, when key information for descrambling is recorded at the top of a scrambled digital video signal which is a program signal, the program signal can be obtained together with the key information at the time of restarting the next reproduce region. However, when the reproducing is suspended and the sequel is reproduced later again, inconvenience that the key information recording position is searched and the key information is reproduced is generated. An example which deals with such inconvenience will be described hereunder.

Figure 9:
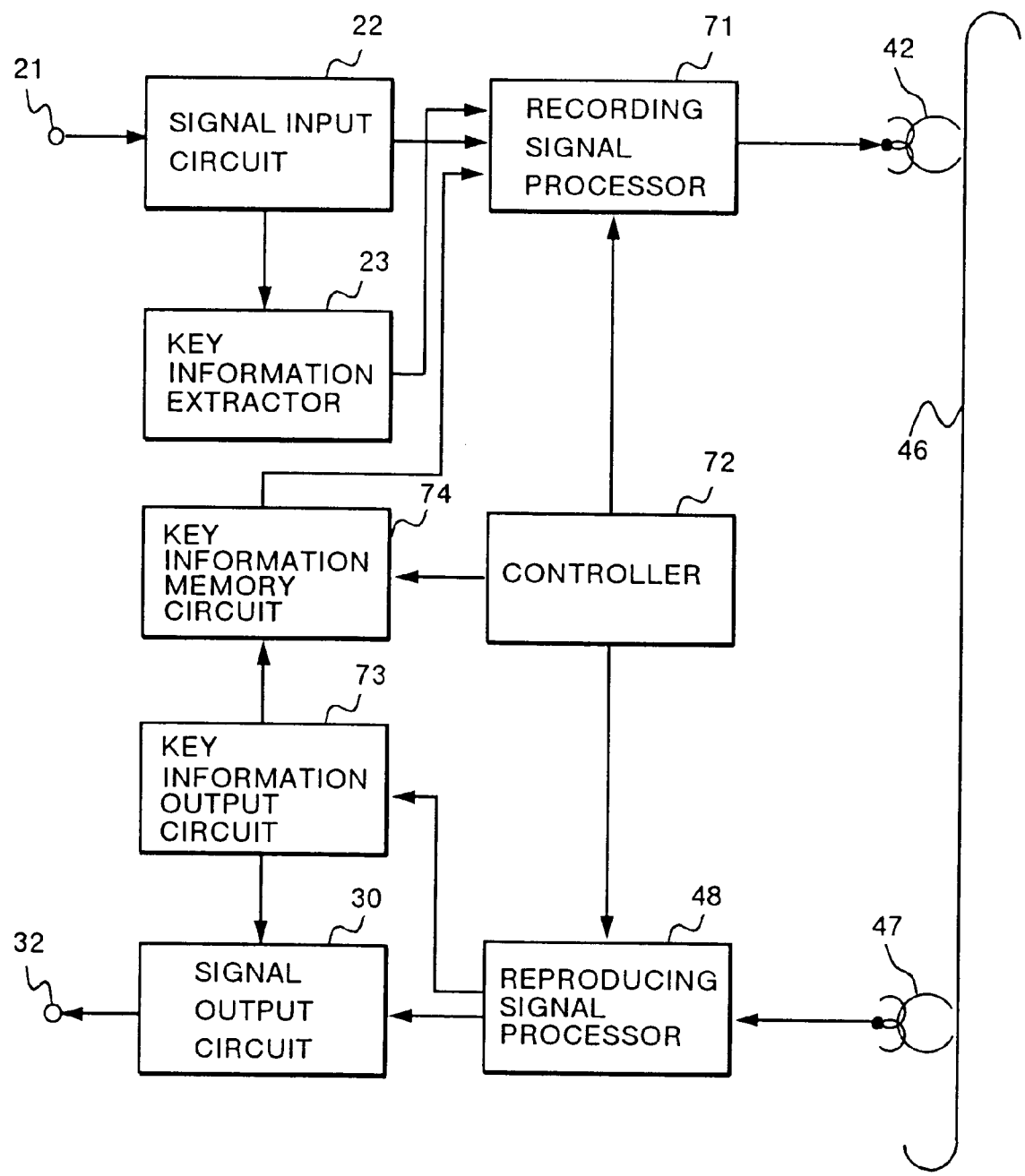
FIG. 9 is a block diagram showing the sixth embodiment of the present invention.
Figure 10:
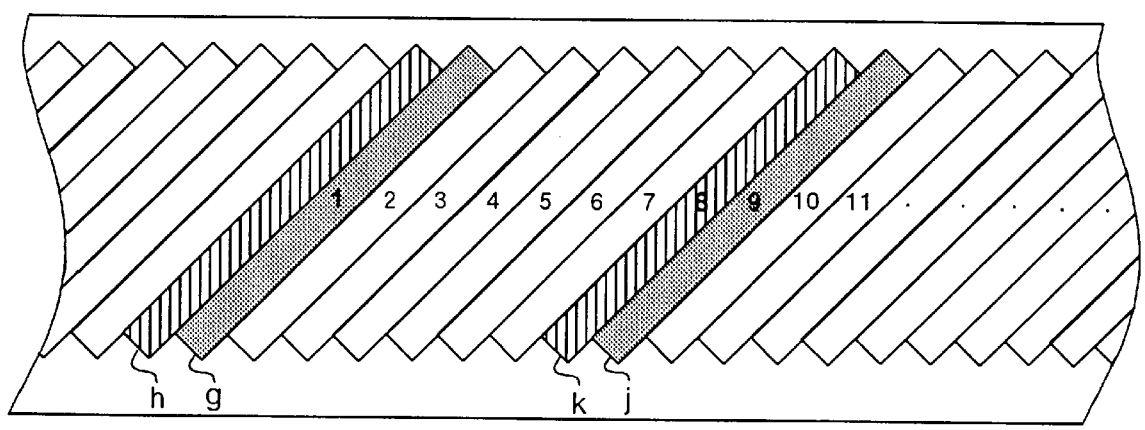
FIG. 10 is a schematical diagram of the signal recording pattern for explaining the embodiment shown in FIG. 9.

FIG. 9 is a block diagram showing an embodiment (sixth embodiment) which is suited to a case that an apparatus of the recording/reproducing system of the present invention suspends reproducing halfway and FIG. 10 is a schematical diagram of the recording pattern on the tape. In FIG. 9, numeral 71 indicates a recording signal processor, 72 a controller, 73 a key information output circuit, and 74 a key information memory circuit. This embodiment is an example that the recording format of key information on the tape of the embodiment shown in FIG. 3 which is mentioned above is changed to that of embodiment shown in FIG. 5 and furthermore even when the reproducing is suspended, inconvenience will not be generated. Needless to say, the embodiment can be suited to the constitution of each of the other embodiments mentioned above.

Also in the embodiment shown in FIG. 9, the operation at the time of general recording and reproducing is equivalent to that of each embodiment mentioned above and the explanation thereof will be omitted. At the time of recording, the key information is recorded on the helical track indicated by "h" shown in FIG. 10 and the scrambled digital video signal is recorded starting from the helical track indicated by "g" in the order of 1, 2, 3, 4, 5, - - - on the magnetic tape 46. At the time of reproducing, the key information which is read from the helical track at "h" shown in FIG. 10 by the rotary magnetic head 47 is sent to the key information output circuit 73 via the reproducing signal processor 48. The key information output circuit 73 sends the key information to the signal output circuit 30 in the predetermined timing and also outputs this key information to the key information memory circuit 74. The key information memory circuit 74 stores the key information from the key information output circuit 73 under control of the controller 72.

When the reproducing is suspended, for example, assuming that the digital video signals up to the 8th helical track shown in FIG. 10 are reproduced and suspended, the controller 72 reads the key information which is stored at the time of restarting the next reproduce region from the key information memory circuit 74 and sends it to the recording signal processor 71. The recording signal processor 71 executes the predetermined signal processing, that is, the processing which is the same as that at the time of signal recording for the inputted key information from the key information memory circuit and records the key information on the helical track indicated by "k" shown in FIG. 10 on the magnetic tape 46 by the rotary magnetic head 42 under control of the controller 72. By doing this, without the magnetic tape 46 being rewound up to the head thereof so as to reproduce the key information from the helical track at "h" shown in FIG. 10 when the next reproduce region is to be restarted, the key information recorded on the helical track at "k" shown in FIG. 10 is reproduced and then the scrambled digital video signal can be reproduced continuously starting from the helical track "j" after the reproducing is suspended in the order of 9, 10, 11, - - - -.

As mentioned above, in this embodiment, even when the reproducing is suspended and then restarted, a viewer can view a program continuously without inconvenience. Furthermore, when the key information on the magnetic tape 46 is erased after the reproducing is started as shown in the embodiment in FIGS. 5 and 6, recording key information on the magnetic tape 46 as shown in this embodiment is effective when the reproducing is suspended, the magnetic tape 48 is ejected, or the power switch of the apparatus is turned off during reproducing. Furthermore, when the reproducible number of the same part is limited, the controller 72 may be constituted so as to record key information on the magnetic tape 46 beforehand as shown in this embodiment and to rewind or fast forward the tape even when the magnetic tape 46 is to be rewound or fast forwarded. In this case, it may be controlled by the controller 72 so that the key information stored by the key information memory circuit 74 is recorded on the magnetic tape 46 and then erased.

Figure 11:
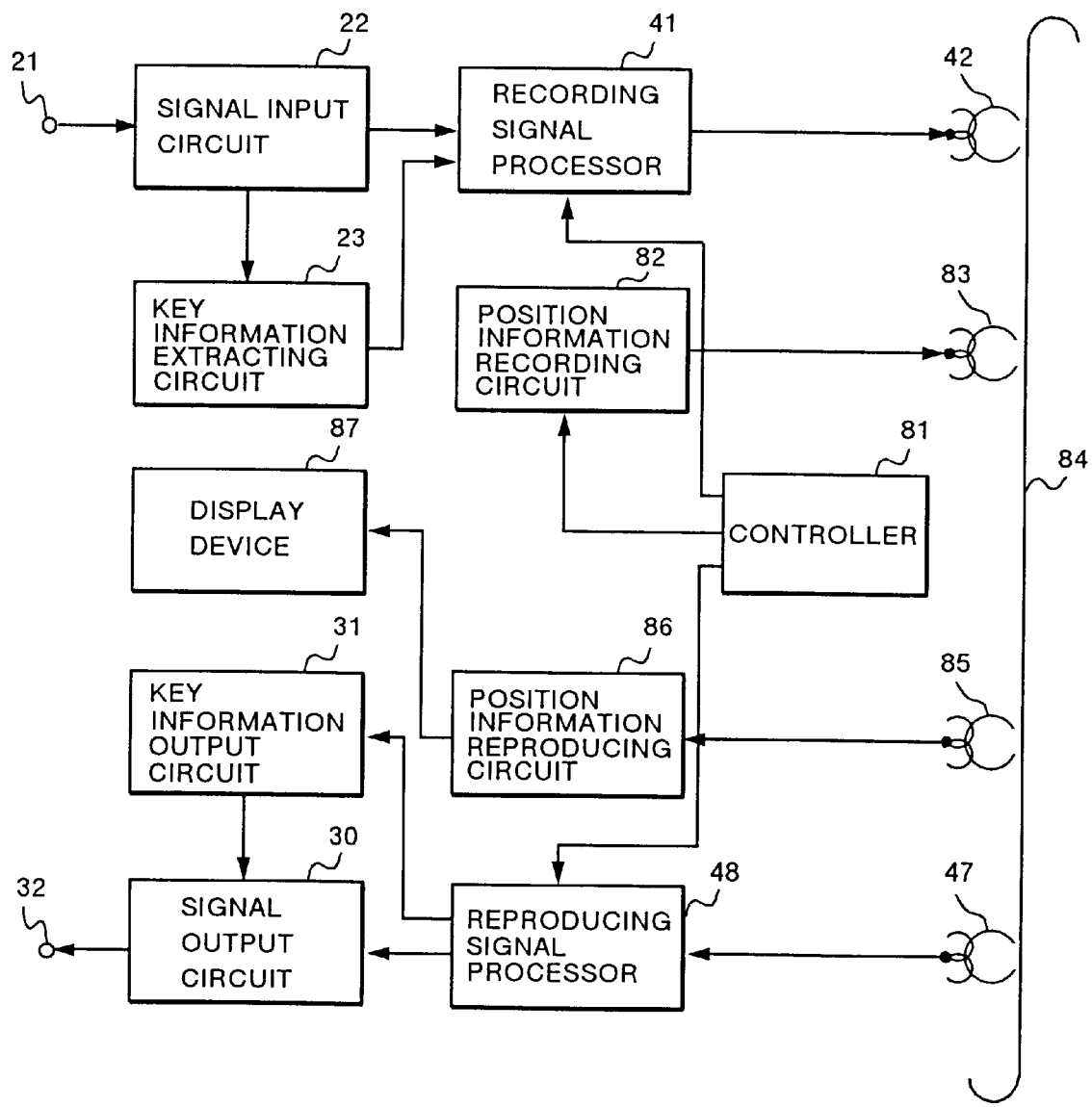
FIG. 11 is a block diagram showing the seventh embodiment of the present invention.
Figure 12:
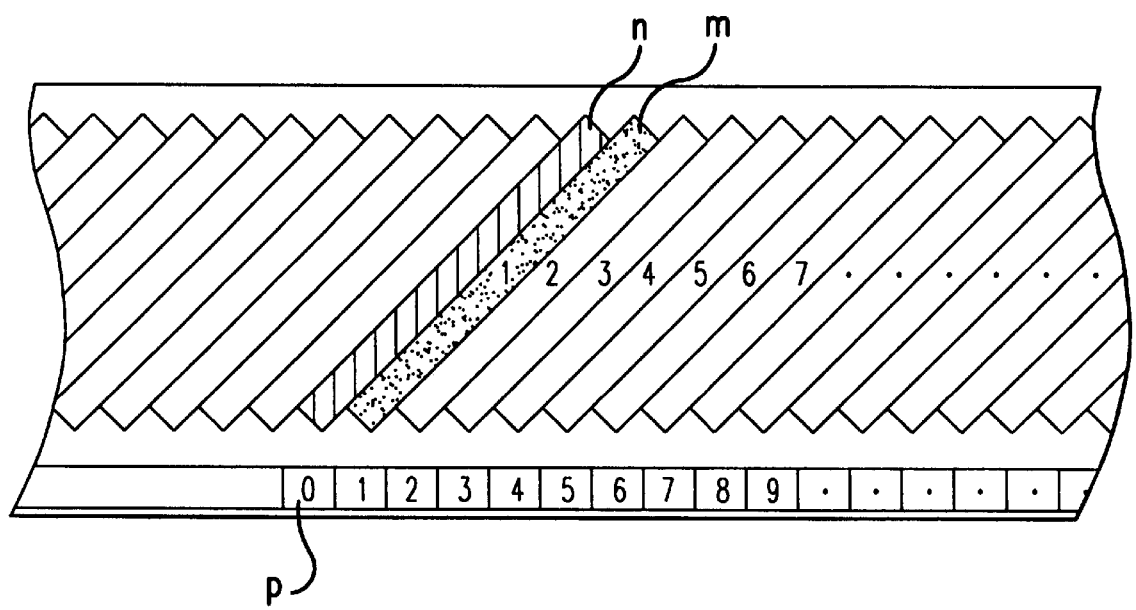
FIG. 12 is a schematical diagram of the signal recording pattern for explaining the embodiment shown in FIG. 11.

FIG. 11 is a block diagram showing another embodiment (seventh embodiment) which is suited to a case that an apparatus of the recording/reproducing system of the present invention suspends reproducing halfway and FIG. 12 is a schematical diagram of the recording pattern on the tape. This embodiment may be inconvenient more than the system explained in the embodiment shown in FIG. 9. However, since there is no need to overwrite a track on which a digital video signal is recorded with key information, the embodiment is effective for a case that reproducing of a plurality of times is allowed. Needless to say, when the signal recording system in the embodiments shown in FIGS. 1 and 3 is used even in the system described in the embodiment shown in FIG. 9, the digital video track will not be rewritten. However, problems such as an increase in the recording density and complication of the apparatus are caused. In FIG. 11, numeral 81 indicates a controller, 82 a position information recording circuit, 83 a stationary magnetic head, 84 a magnetic tape, 85 a stationary magnetic head, 86 a position information reproducing circuit, and 87 a position information display device and the others are the same as those shown in FIG. 5.

Also in the embodiment shown in FIG. 11, the operation at the time of recording and reproducing of key information and a digital video signal is equivalent to that of each embodiment mentioned above and the explanation thereof will be omitted. At the time of recording, the key information and the top of digital video signal are recorded on the helical tracks indicated by "n" and "m" shown in FIG. 12 respectively and the digital video signal is recorded in the order of 1, 2, 3, 4, 5 - - - as shown in FIG. 12. On the other hand, at the time of start of recording, the controller 81 resets the position information recording circuit 82 and the position information recording circuit 82 counts up starting from there according to recording of digital video signals. In this embodiment, the position information recording circuit 82 counts up for each track of digital video signal. The position information recording circuit 82 records this count value on the linear track of the magnetic tape 84 via the stationary magnetic head 83. By doing this, on the magnetic tape 84, 0 is recorded in the position indicated by "p" shown in FIG.

12 as position information indicating the position of key information and the values indicating the relative position with the key information recording position are recorded in the position of each video signal track in the order of 1, 2, 3, 4, 5, - - -.

At the time of reproducing, the linear track position information is reproduced by the stationary magnetic head 85, sent to the position information reproducing circuit 86, converted to an actual numerical value, and displayed in the form that it can be seen by a viewer by the display device 87. The viewer refers to this display, rewinds or fast forwards the tape until the display becomes 0, reproduces the key information, and cues up the position to be reproduced by fast forwarding or rewinding the tape with reference to this display.

It is necessary that the relative position information is reproduced and displayed at the time of fast forwarding or rewinding, so that it is desirable to record it on the linear track as shown in FIG. 12. However, to avoid complication of the apparatus, it is effective to record it on the helical track by region dividing.

Figure 13:
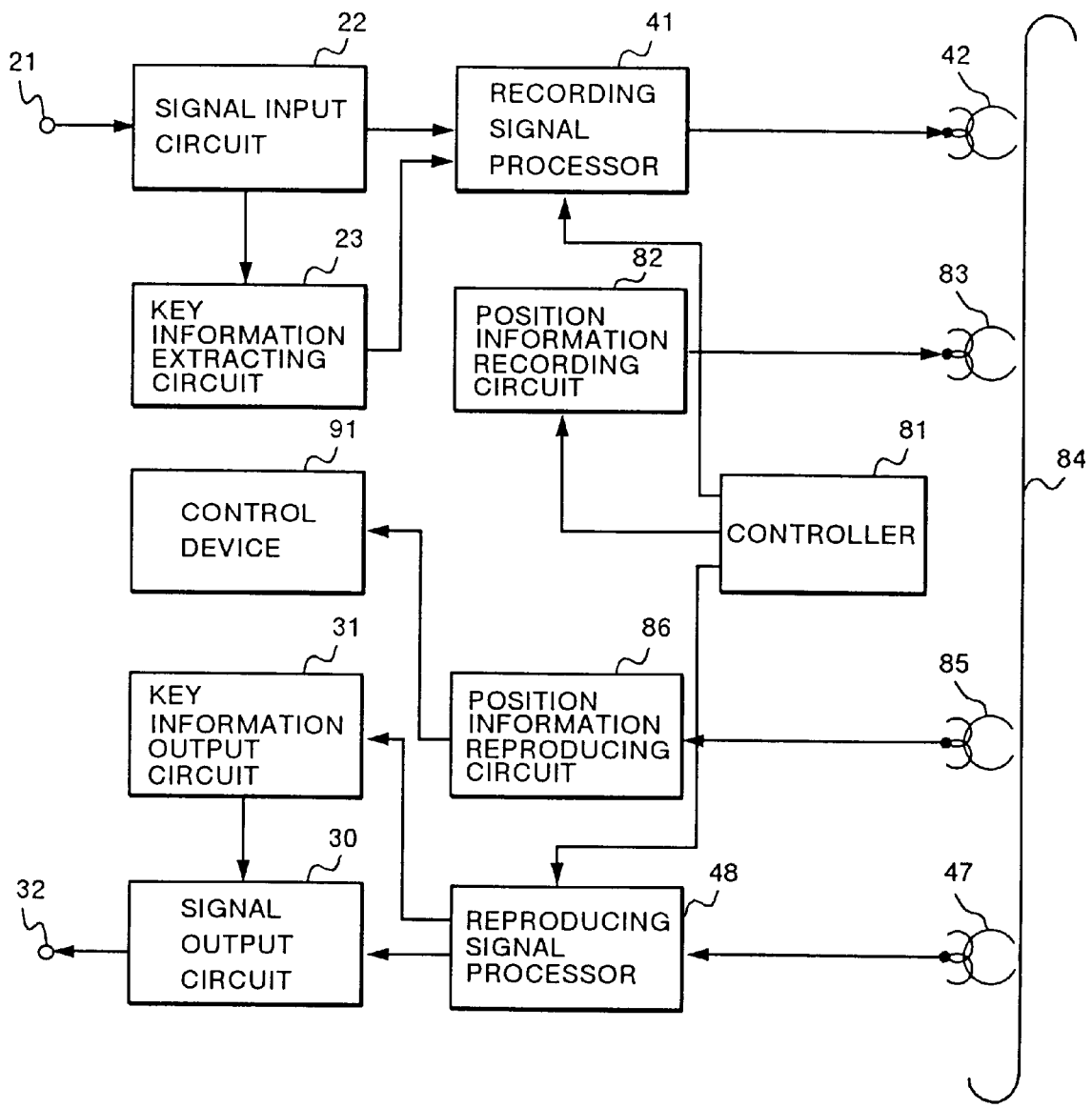
FIG. 13 is a block diagram showing the eighth embodiment of the present invention.
Figure 14:
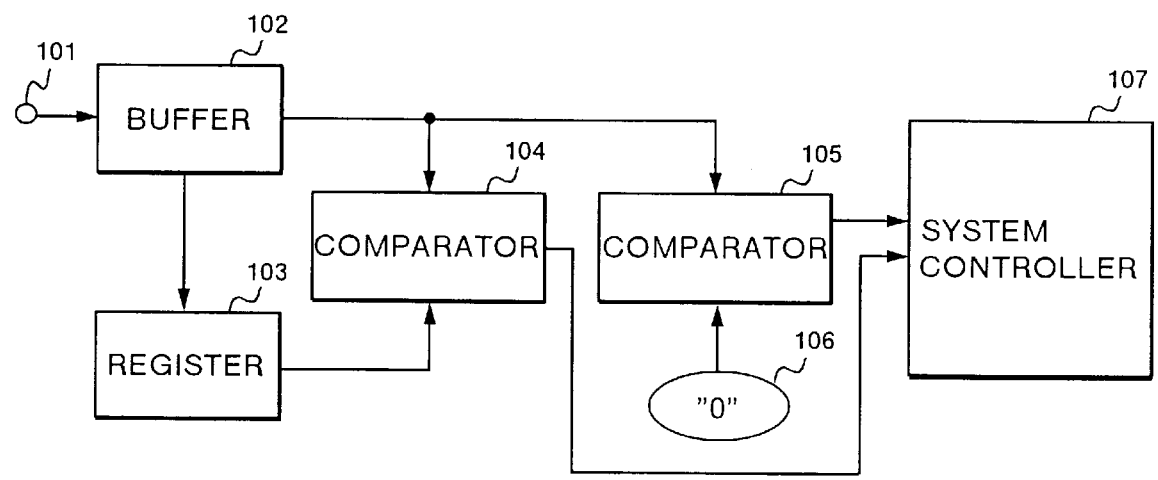
FIG. 14 is a block diagram showing the constitution example of the control device in the embodiment shown in FIG. 13.

In the embodiment shown in FIG. 11, it is necessary that a viewer looks at the display and operates. However, reproducing of key information and cuing up and starting of program signal reproducing can be executed automatically. Next, an example thereof will be explained with reference to FIGS. 13 and 14. FIG. 13 is a block diagram showing still another embodiment (eighth embodiment) which is suited to a case that an apparatus of the recording/reproducing system of the present invention suspends reproducing halfway. Numeral 91 indicates a control device for controlling the operation of the recording/reproducing apparatus and the others are the same as those of the embodiment shown in FIG. 11. FIG. 14 is a block diagram showing an constitution example of the control device 91 among them. Numeral 101 indicates a position information input terminal, 102 a buffer, 103 a register, 104 and 105 comparators, 106 a reference data generator which has a value of 0, and 107 a so-called system controller for controlling the operation of the recording/reproducing apparatus.

In the embodiment shown in FIG. 13, recording and reproducing of key information, a digital video signal, and position information are the same as those of the embodiment shown in FIG. 11 and the explanation thereof will be omitted and only the characteristic part will be explained hereunder. When the magnetic tape 84 is started to reproduce halfway, the position information reproducing circuit 86 outputs the value of relative position information as shown at "p" in FIG. 12 successively. This relative position information is inputted to the control device 91 and inputted to the buffer 102 via the position information input terminal 101. The relative position information at the program reproducing start point which is inputted to the buffer 102 is saved in the register 103. The buffer 102 outputs relative position information which is inputted continuously to the comparators 104 and 105 successively.

From the point of time when the reproducing operation is started, the system controller 107 operates by the output of the comparator 105 first. The comparator 105 compares the relative position information to be inputted with a value of 0, that is, the reference data 106 having the position information of key information. When the relative position information at the current tape position which is inputted from the buffer 102 is larger than 0, the comparator 105 rewinds the tape, or when it is smaller than 0, the comparator 105 forwards the tape fast, or when it is equal to 0, the comparator 105 sends an instruction of stop to the system controller 107. When the key information is cued up like this, the system controller 107 puts the apparatus into the reproducing state and the key information is reproduced. The system controller 107 is switched so as to operate by the output of the comparator 104. The comparator 104 compares the relative position information at the program reproducing start point which is saved in the register 103 with the relative position information at the current point which is inputted to the buffer 102 successively. When the value of the buffer 102 is smaller than the value of the register 103, the comparator 104 forwards the tape fast, or when it is larger, the comparator 104 rewinds the tape, or when it is equal, the comparator 104 sends an instruction of reproducing to the system controller 107. By doing this, in this embodiment, key information can be reproduced automatically and a program can be reproduced halfway. Needless to say, when the comparators 104 and 105 send a little more detailed control instruction to the system controller 107, the operation will become smooth. For example, when the comparator 104 or 105 sends an instruction that when the difference between two inputs becomes smaller, the tape running speed is decreased to the system controller 107, excessive feeding of the tape is eliminated and cuing up can be performed smoothly.

As explained above, according to the present invention, a signal recording/reproducing method and apparatus therefor by which the CATV station eliminates a possibility that a program which is distributed for specified viewers with payment is viewed by the public at any location without payment and on the other hand, a viewer can view a broadcasted program freely at any time he wants can be realized.

According to the present invention, even when the reproducible number is limited, a recording/reproducing method and apparatus therefor which will not be disadvantageous both for the program distributing side and the viewing side can be realized.

Furthermore, even when the reproducing is suspended halfway and restarted later, inconvenience of viewers can be minimized.

What is claimed is:

1. A signal recording/reproducing method in a recording/reproducing system having a signal recording medium and a recording/reproducing means on said medium, comprising the steps of:

inputting a scrambled content signal;

recording said inputted scrambled content signal as it is in a first area on said signal recording medium;

recording key information related for descrambling said scrambled content signal at a position where it can be reproduced before reproducing the scrambled content signal, said position being in a second area on said signal recording medium said second area being in an area different from said first area, and is a preliminarily reserved area for recording only said key information, and can be recorded/reproduced independently from said first area;

reading the recorded key information before reproducing said scrambled content signal; and reproducing said scrambled content signal descrambling by use of the read key information at the time of reproducing.

2. A recording/reproducing method according to claim 1, further comprising the step of:

reproducing said key information before reproducing said scramble content signal and then erasing the recorded key information from said second area on said signal recording medium.

3. A recording/reproducing method according to claim 1, further comprising the step of:

reproducing said key information before reproducing said scrambled content signal and then overwriting and changing the recorded key information on the signal recording medium.

4. A signal recording/reproducing method in a recording/reproducing system having a signal recording medium and a recording/reproducing means on said medium, comprising the steps of:

inputting a scrambled content signal;

receiving key information related for descrambling said scrambled content signal via the same signal channel as that of the inputted scrambled content signal;

recording said inputted scrambled content signal in a first area on said signal recording medium, and the received key information in a second area on said signal recording medium at a position where said key information can be reproduced before reproducing said scrambled content signal, said second area being in an area different from said first area, and is a preliminarily reserved area for recording only said key information, and can be recorded/reproduced independently from said first area;

reading the recorded key information before reproducing said scrambled content signal; and reproducing said scrambled content signal descrambling by use of the read key information at the time of reproducing.

5. A signal recording/reproducing method in a recording/reproducing system having a signal recording medium and a recording/reproducing means on said medium, comprising the steps of:

inputting a scrambled content signal;

recording said inputted scrambled content signal as it is in a first area on said signal recording medium;

recording key information for descrambling said scrambled content signal at a position where it can be reproduced before reproducing the scrambled content signal, said position being in a second area on said signal recording medium said second area being in an area different from said first area, and is a preliminarily reserved area for recording only said key information, and can be recorded/reproduced independently from said first area, said key information being recorded only in said second area;

reading the recorded key information before reproducing said scrambled content signal;

reproducing said scrambled content signal by descrambling with the read key information at the time of reproducing; and storing said key information, when suspending the reproducing of the scrambled content signal, in a storing device, for rewriting said key information on another second area near the unreproduced part of said scrambled content signal, for reproducing the unreproduced part immediately after restart from the suspension.

6. A recording/reproducing method according to claim 5, wherein said signal recording medium is a magnetic tape, further comprising the steps of:

rerecording the stored key information in a position before the unreproduced part of said signal recording medium before performing one of the operations of reversing, rewinding, and ejecting of said signal recording medium; and starting said one of the operations of reversing, rewinding, and ejecting, thereafter.

7. A signal recording/reproducing method in a recording/reproducing system having a signal recording medium and a recording/reproducing means on said medium, comprising the steps of:

inputting a scrambled content signal;

recording said inputted scrambled content signal as it is in a first area on said signal recording medium;

recording key information for descrambling said scrambled content signal at a position where it can be reproduced before reproducing the scrambled content signal, said position being in a second area on said signal recording medium;

recording a position information indicating the current recording position relative to the key information recording position on said signal recording medium;

reading the recorded key information based upon the recorded position information, before reproducing said scrambled content signal; and reproducing said scrambled content signal by descrambling with the read key information at the time of reproducing.

8. A recording/reproducing method according to claim 7, wherein said signal recording medium is a magnetic tape, further comprising the steps of:

reproducing said position information before reproducing the scrambled content signal and obtaining the relative position of the current position on said magnetic tape from the key information recording position;

cuing up the key information recording position by one of operations of reversing, rewinding, and fast forwarding the signal recording medium on the basis of said relative position information;

reproducing said key information and rewinding the signal recording medium up to the reproducing start position again; and starting said signal reproducing at the rewound start position.

9. A recording/reproducing apparatus, comprising:

a signal recording medium;

means for inputting a scrambled content signal;

means for recording the inputted scrambled content signal as it is in a first area on said signal recording medium;

information recording means for recording key information related for descrambling said scrambled content signal at a position where it can be obtained before reproducing the scrambled content signal, said position being in a second area on said signal recording medium, said second area being in an area different from said first area, and is a preliminarily reserved area for recording only said key information, and can be recorded/reproduced independently from said first area;

information reproducing means for obtaining the recorded key information before reproducing said scrambled content signal; and signal reproducing means for reproducing the recorded scrambled content signal descrambling by use of the obtained key information.

10. A recording/reproducing apparatus according to claim 9, further comprising:

means for reproducing said key information before reproducing said scrambled content signal and then erasing the recorded key information from said second area on said signal recording medium.

11. A recording/reproducing apparatus according to claim 9, further comprising:

means for reproducing said key information before reproducing said scrambled content signal and then overwriting and changing the recorded key information on the signal recording medium.

12. A recording/reproducing apparatus according to claim 9, further comprising:

means for storing said key information, when suspending the reproducing of the scrambled content signal, in a storing device, for rewriting said key information on another second area near the unreproduced part of said scrambled content signal for reproducing the unreproduced part immediately after restart from the suspension.

13. A recording/reproducing apparatus according to claim 12, wherein said signal recording medium is a magnetic tape, further comprising:

means for rewriting the stored key information in a position just before the unreproduced part of said signal recording medium before transferring to a mode other than the reproducing mode.

14. A recording/reproducing apparatus according to claim 9, wherein said signal recording medium is a magnetic tape, further comprising:

means for recording a position information indicating the current recording position relative to the key information recording position on said signal recording medium; and means for consulting said key information recording position.

15. A recording/reproducing apparatus according to claim 14, further comprising:

means for reproducing said position information before reproducing the scrambled content signal and obtaining the relative position of the current position on said magnetic tape from the key information recording position;

means for cuing up the key information recording positions by one of operations of reversing, rewinding, and fast forwarding of the signal recording medium, and fast forwarding of the signal recording medium, on the basis of said relative position information;

means for reproducing said key information and rewinding the signal recording medium up to the reproducing start position again; and means for starting said signal reproducing at the rewound start position.

16. A recording/reproducing apparatus, comprising a signal recording medium;

means for inputting a scrambled content signal;

means for receiving key information related for descrambling said scrambling via the same signal channel as that of the inputted scrambled content signal;

means for recording the inputted scrambled content signal in a first area on said signal recording medium, and the received key information in a second area on said signal recording medium, said second area being in an area different from said first area and is a preliminarily reserved area for recording only said key information, and can be recorded/reproduced independently from said first area;

means for reading the recorded key information before reproducing said scrambled content signal; and means for reproducing said scrambled content signal descrambling by use of the read key information at the time of reproducing.

17. A reproducing apparatus, comprising:

a signal recording medium for recording a scrambled content signal in a first area in said signal recording medium and key information related for descrambling said scrambled content signal at a position where they can be obtained before reproducing the scrambled content signal, said position being in a second area on said signal recording medium, said second area being in an area different from said first area, and is a preliminarily reserved area for recording only said key information, and can be recorded/reproduced independently from said first area;

information reproducing means for obtaining the key information recorded in said second area on said signal recording medium; and signal reproducing means for reproducing the recorded scrambled content signal descrambling by use of the obtained key information.

18. A reproducing apparatus according to claim 17, further comprising:

means for reproducing said key information before reproducing said scrambled content signal and then erasing the recorded key information from said second area on said signal recording medium.

19. A reproducing apparatus according to claim 17, further comprising:

means for reproducing said key information before reproducing said scrambled content signal and then overwriting and changing the recorded key information on said signal recording medium.

20. A reproducing apparatus according to claim 17, further comprising:

means for storing said key information, when suspending the reproducing of the scrambled content signal, in a storing device, for rewriting said key information on another second area near the unreproduced part of said scrambled content signal for reproducing the unreproduced part immediately after restart from the suspension.

21. A reproducing apparatus according to claim 20, wherein said signal recording medium is a magnetic tape, further comprising:

means for rewriting the stored key information in a position just before the unreproduced part of said signal recording medium before transferring to a mode other than the reproducing mode.

22. A reproducing apparatus according to claim 17, wherein said signal recording medium is a magnetic tape, further comprising:

means for reproducing a position information indicating the current recording position relative to a key information recording position on said signal recording medium; and means for consulting said key information recording position.

23. A reproducing method according to claim 22, further comprising:

means for reproducing said position information before reproducing the scrambled content signal and obtaining the relative position of the current position on said magnetic tape from the key information recording position;

means for cuing up the key information recording position by one of operations of reversing, rewinding, and fast forwarding of the signal recording medium, on the basis of said relative position information;

means for reproducing said key information and rewinding the signal recording medium up to the reproducing start position again; and means for starting said signal reproducing at the rewound start position.

24. A signal recording/reproducing method in a recording/reproducing system having a signal recording medium and a recording/reproducing means on said medium, comprising the steps of;

inputting a scrambled content signal;

recording said inputted scrambled content signal as it is in a first area on said signal recording medium;

recording key information related for descrambling said scrambled content signal at a position where it can be reproduced before reproducing the scrambled content signal, said position being in a second area on said signal recording medium, said second area being in an area different from said first area, and is a preliminarily reserved area for recording only said key information, and can be recorded/rewritten independently from said first area without disturbing any recorded signals other than said key information, said key information being recorded only in said second area;

reading the recorded key information before reproducing said scrambled content signal; and reproducing said scrambled content signal descrambling by use of the read key information at the time of reproducing.

25. A signal recording/reproducing method in a recording/reproducing system having a signal recording medium and a recording/reproducing means on said medium, comprising the steps of:

inputting a scrambled content signal;

recording said inputted scrambled content signal as it is in a first area on said signal recording medium;

recording key information for descrambling said scrambled content signal at a position where it can be reproduced before reproducing the scrambled content signal, said position being in a second area on signal recording medium, said second area being in an area different from said first area, and is a preliminarily reserved area for recording only said key information, and can be recorded/rewritten independently from said first area without disturbing any recorded signals other than said key information, said key information being recorded only in said second area;

reading the recorded key information before reproducing said scrambled content signal;

reproducing said scrambled content signal by descrambling with the read key information at the time of reproducing; and storing said key information, when suspending the reproducing of the scrambled content signal, in a storing device rewriting said key information on another second area near the unreproduced part of said scrambled content signal, for reproducing the unreproduced part immediately after restart from the suspension.

26. A recording/reproducing apparatus, comprising:

a signal recording medium;

means for inputting a scrambled content signal;

means for recording the inputted scrambled content signal as it is in a first area on said signal recording medium;

information recording means for recording key information related for descrambling said scrambled content signal at a position where it can be obtained before reproducing the scrambled content signal, said position being in a second area on said signal recording medium, said second area being in an area different from said first area, and is a preliminarily reserved area for recording only said key information, and can be recorded/rewritten independently from said first area without disturbing any recorded signals other than said key information, said key information being recorded only in said second area;

information reproducing means for obtaining the recorded key information before reproducing said scrambled content signal; and signal reproducing means for reproducing the recorded scrambled content signal descrambling by use of the obtained key information.

* * * * *